(12) United States Patent  
Blevins (10) Patent No.: US 7,865,804 B2
(45) Date of Patent: Jan. 4, 2011

(54) SYSTEM AND METHOD FOR ENHANCED ERROR DETECTION IN MEMORY PERIPHERALS

(75) Inventor: Charles William Blevins, Madison, AL (US)

(73) Assignee: Smiths Aerospace LLC, Grand Rapids, MI (US)

( * ) Notice: Subject to any disclaimer, the term of this patent is extended or adjusted under 35 U.S.C. 154(b) by 588 days.

(21) Appl. No.: 11/295,721

(22) Filed: Dec. 7, 2005

(65) Prior Publication Data

US 2006/0259848 A1 Nov. 16, 2006

(51) Int. Cl.
*G11C 29/00* (2006.01)
(52) U.S. Cl. .................. 714/763; 714/764; 714/767
(58) Field of Classification Search .............. 714/763, 714/5, 6, 42, 52, 802, 804
See application file for complete search history.

(56) References Cited

U.S. PATENT DOCUMENTS 5,177,744 A * 1/1993 Cesare et al. ............... 714/6
5,450,423 A * 9/1995 Iwasaki et al. ............. 714/767
5,781,568 A * 7/1998 Hsieh ......................... 714/767
5,905,854 A * 5/1999 Nielson et al. .............. 714/6
5,953,351 A * 9/1999 Hicks et al. ................. 714/763
7,409,581 B2 * 8/2008 Santeler et al. ............. 714/6

FOREIGN PATENT DOCUMENTS

EP 0 474 451 A 3/1992

* cited by examiner

*Primary Examiner*—Sam Rizk
(74) *Attorney, Agent, or Firm*—William Scott Andes, Esq.; Armstrong Teasdale LLP (57) ABSTRACT

A system and method for detecting and correcting errors in a memory in a device includes generating an error value of data stored at first predetermined locations in a first memory. The generated error value is compared to a corresponding error value stored in an error memory, each value in the error memory being calculated from at least two data values stored at predetermined locations in the first memory. The data stored in the first predetermined locations of the first memory is rewritten with data stored in first predetermined locations of a second memory if the generated error value is different than the corresponding error value stored in the error memory, the data stored in the second memory being the same as the data stored in the first memory.

15 Claims, 5 Drawing Sheets

SYSTEM AND METHOD FOR ENHANCED ERROR DETECTION IN MEMORY PERIPHERALS

FIELD OF THE INVENTION

The present invention relates generally to error detection and, more particularly, to a system and method for enhanced error detection in memory peripherals.

BACKGROUND OF THE INVENTION

In any electronic system that operates critical functionality, it is useful to have the ability to detect errors to a certain probable degree. These errors can occur from various sources including random errors caused by radiation effects on electronic parts, specifically large banks of random access memory (RAM). RAM devices are susceptible to radiation induced bit changes, which can lead to erroneous system behavior if gone undetected. The ability to correct bit errors is also desirable because it allows the system to continue operation in spite of radiation induced bit errors.

In conventional systems, designs have incorporated hamming code based error detection and correction (EDC) schemes to accomplish error detection and correction. These schemes are adequate for single bit detection and correction. However, as RAM device geometries have gotten smaller, individual radiation events have begun to affect multiple bits in the same device with higher probabilities. The error rate for such memory devices is around 1.5E-10 errors per bit-hour. For a given memory size of 128 Mbits, the memory system error rate is 1.5E-10*1.28E8=0.00192 failures per hour or an uncorrectable event every 500 hours. EDC cannot detect even bit failures beyond 2 bits. Hence, some errors are not detectable by EDC, causing the undetected error rate to be too high for a single threaded memory system to host critical functions.

Accordingly, it would be desirable to detect and correct all errors so that the restart rate due to soft errors would go to zero.

SUMMARY OF THE INVENTION

According to an aspect of the invention, a system and method for detecting and correcting errors in a memory in a device includes generating an error value of data stored at first predetermined locations in a first memory. The generated error value is compared to a corresponding error value stored in an error memory, each value in the error memory being calculated from at least two data values stored at predetermined locations in the first memory. The data stored in the first predetermined locations of the first memory is rewritten with data stored in first predetermined locations of a second memory if the generated error value is different than the corresponding error value stored in the error memory, the data stored in the second memory being the same as the data stored in the first memory.

Further features, aspects and advantages of the present invention will become apparent from the detailed description of preferred embodiments that follows, when considered together with the accompanying figures of drawing.

DETAILED DESCRIPTION OF PREFERRED EMBODIMENTS

Figure 1:
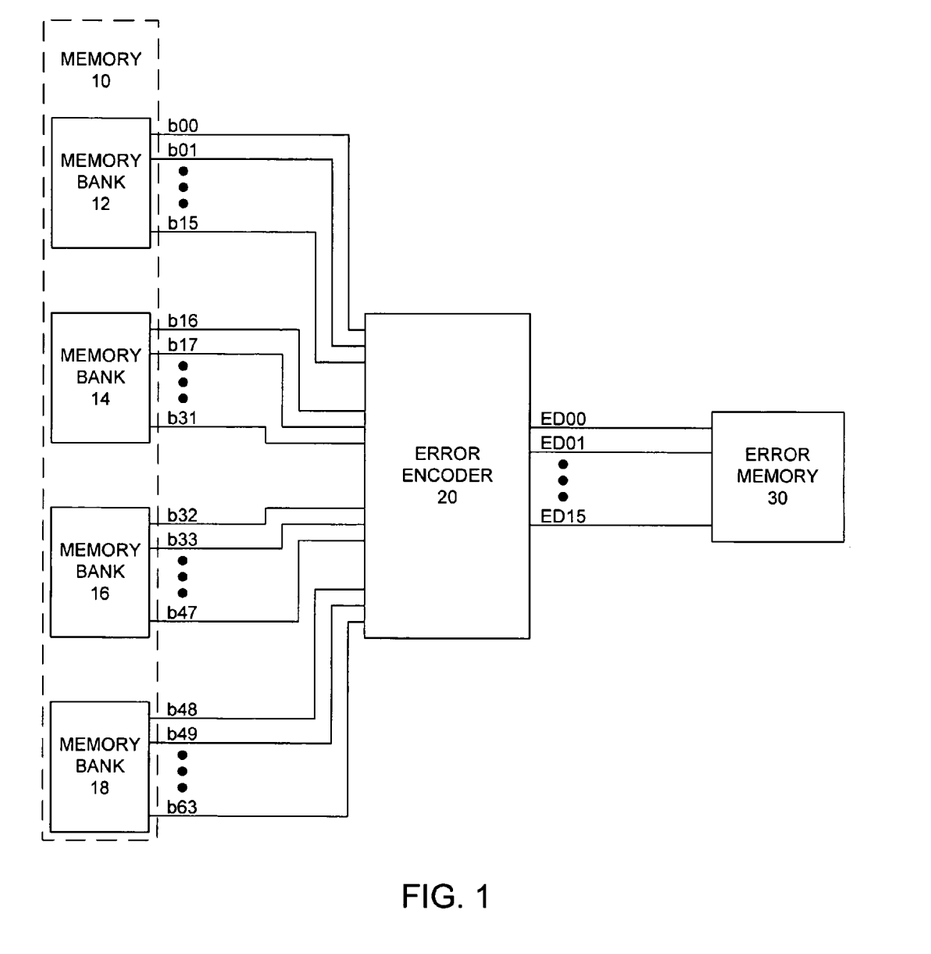
FIG. 1 is a block diagram of a memory and error coding system that can be used in an enhanced error detection system consistent with the present invention.

FIG. 1 is a block diagram of a memory and error encoder system that can be used in an enhanced error detection system consistent with the present invention. As shown in FIG. 1, the memory and error coding system includes a memory 10, an error encoder 20, and an error memory 30. The memory 10 includes a plurality of memory banks 12, 14, 16, and 18. Although there are four memory banks 12, 14, 16, and 18 shown in FIG. 1, it should be understood that the memory 10 may comprise one or more memory banks or may have a configuration different from one having separate memory banks.

Each of the memory banks 12, 14, 16, and 18 has a 16-bit width that combine to give the memory 10 a 64-bit width. The depth of each memory bank 12, 14, 16, and 18 can be an arbitrary size N, such that each memory bank 12, 14, 16, and 18 has a size of 16×N, and the memory 10 has a size of 64×N. The sizes and widths of the memory banks 12, 14, 16, and 18 and the memory 10 shown in FIG. 1 are exemplary only and can be adjusted as needed for the particular application for which the memory 10 is to be used. The memory 10 is preferably implemented as a RAM device, such as a flash memory or NVRAM, although other types of memories are also possible. Each of the 16-bit outputs of the memory banks 12, 14, 16, and 18 is coupled to the error encoder 20.

The error encoder 20 receives 64 bits of data from the memory banks 12, 14, 16, and 18 of the memory 10 and generates 16 bits of error data for each set of 64 bits of data received from the memory 10. The error encoder 20 is preferably configured to generate an error value from four data bits, one bit each from the memory banks 12, 14, 16, and 18. In addition, the bits selected from each memory bank 12, 14, 16, and 18 are preferably in the same corresponding location of each one. For example, error bit ED00 can be calculated by the error encoder 20 from data bits b00, b16, b32, and b48 of memory banks 12, 14, 16, and 18, respectively. In general, the data bits selected to calculate the error data can be other combinations, but preferably where the combination is based on predetermined locations within the memory 10. The process of creating the error data is repeated for each of the N levels of 16-bit data in the memory banks 12, 14, 16, and 18.

The error data generated by the error encoder 20 is provided to the error memory 30 which stores the error data. The error memory 30 is preferably configured to have the same size and width as the memory banks 12, 14, 16, and 18, although other size and width configurations are possible.

Figure 2:
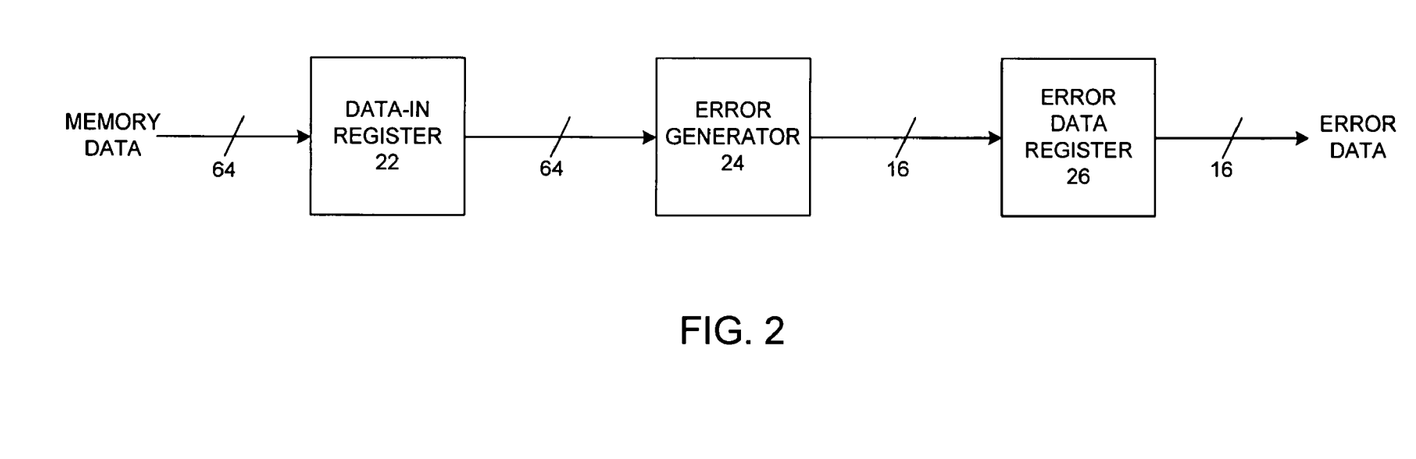
FIG. 2 is a block diagram of an error encoder that can be used in an enhanced error detection system consistent with the present invention.

FIG. 2 is a block diagram of an error encoder that can be used in an enhanced error detection system consistent with the present invention. As shown in FIG. 2, an error encoder, such as the error encoder 20 of FIG. 1, includes a data-in register 22, an error generator 24, and an error data register 26. Assuming the memory 10 providing data to the error encoder 20 is designed as shown in FIG. 1, the data-in register 22 receives and stores 64 bits of memory data from the memory 10. The data-in register 22 can be a 64-bit register to be able to store each of the 64 bits of data from the memory 10. The size of the data-in register 22 can be adjusted in accordance with the bit width of the memory 10. The data-in register 22 can also be made larger than the bit width of the memory 10, such as to store other bits of data that could be used by the error encoder 20.

The data-in register 22 provides the 64 bits of memory data to the error generator 24. The error generator generates 16 bits of error data from the 64 bits of memory data. Each bit of error data is preferably a parity value of the bits of memory data used to calculate each error bit. For example, error bit ED00 can be calculated by the error generator 24 as the parity value resulting from data bits b00, b16, b32, and b48 of memory 10. The parity value essentially indicates if the group of memory data bits used to calculate the parity value has an odd or even number of 1s. As a result, if there is an error in a particular location in one of the memory banks 12, 14, 16, and 18, the number of 1s in the group of memory data bits would change and the resulting parity value would no longer match the parity value calculated before the error occurred.

To calculate the parity values, the 16 error bits can be calculated according to the following equation:

$$EE_k = b_k \text{XOR} b_{k+16} \text{XOR} b_{k+32} \text{XOR} b_{k+48},$$

where k is an integer value between 0 and 15 and XOR is the exclusive OR operation. This equation can be adjusted in accordance with the configuration of the memory 10 and the error memory 30. For example, the error memory 30 can be increased in size to hold more error data and allow parity values to be calculated from a smaller group of memory bits or from multiple combinations of memory bits.

The error data generated by the error generator 24 is provided to the error data register 26. The error data register 26 is preferably configured as a 16-bit register, although the size of error data register 26 can be adjusted in accordance with the amount of error data output from the error generator 24. The error data register 26 stores the output data before providing it to the error memory 30. The error generation process performed by the data-in register 22, the error generator 24, and the error data register 26 is repeatedly performed for each group of 64-bit data provided by the memory 10 so that each bit of memory data is associated with at least one error bit stored in the error memory 30.

Figure 3:
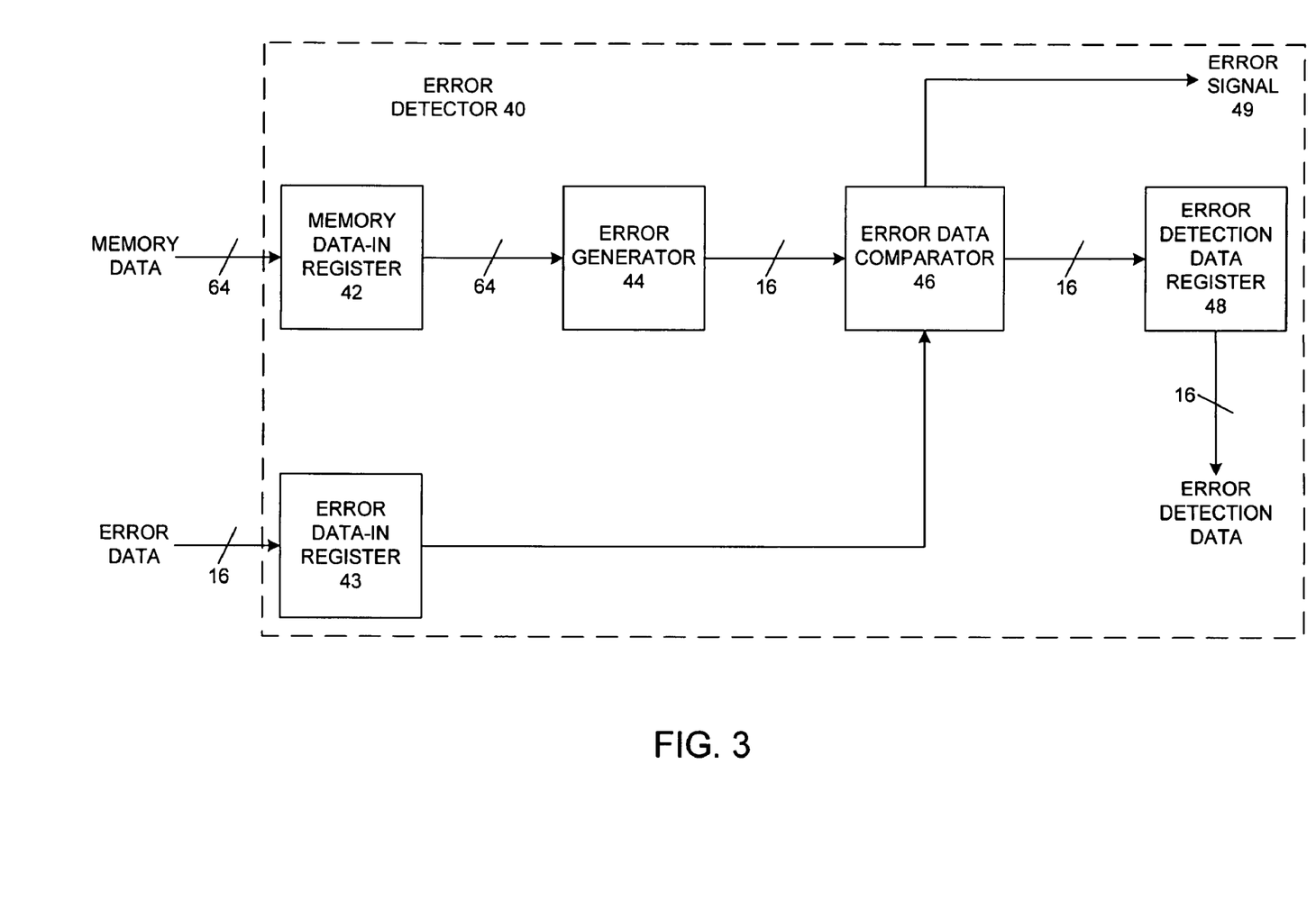
FIG. 3 is a block diagram of an error detector that can be used in an enhanced error detection system consistent with the present invention.

FIG. 3 is a block diagram of an error detector that can be used in an enhanced error detection system consistent with the present invention. As shown in FIG. 3, an error detector 40 includes a memory data-in register 42, an error data-in register 43, an error generator 44, an error data comparator 46, and an error data detection data register 48. The error detector uses the memory data from the memory 10 and the error data from the error memory 30 to detect whether there are any bit errors in the memory 10.

Assuming the memory 10 and error memory 30 are designed as shown in FIG. 1, the memory data-in register 42 receives and stores 64 bits of memory data from the memory 10, and the error data-in register 43 receives and stores 16 bits of error data from the error memory 30. The memory data-in register 42 can be a 64-bit register to be able to store each of the 64 bits of data from the memory 10, and the error data-in register 43 can be a 16-bit register to be able to store each of the 16 bits of data from the error memory 30. The size of the memory data-in register 42 and the error data-in register 43 can be adjusted in accordance with the bit width of the memory 10 and the error memory 30, respectively.

The memory data-in register 42 provides the 64 bits of memory data to the error generator 44. The error generator 44 is preferably configured in the same manner as the error generator 24 of the error encoder 20 to generate 16 bits of error data from the 64 bits of memory data. Each bit of error data is preferably a parity value of the bits of memory data used to calculate each error bit.

The error data generated by the error generator 44 and the error data from the error data-in register 43 are provided to the error data comparator 46. The error data comparator 46 compares the error data generated by the error generator 44 with the error data from the error data-in register 43. If all of the bits of the two sets of error data match each other, then the memory data loaded into the memory data-in register 42 is correct. However, if a bit does not match, then there is an error in the memory data loaded into the memory data-in register 42. In particular, the error exists in the non-matching bit(s) of the error data. For example, if the non-matching error bit is bit ED00, then it is recognized that there is an error in the memory data stored at the locations that were used to calculate error bit ED00, i.e., b00, b16, b32, and b48. As will be explained below, the data in the memory 10 can be corrected by rewriting the data at these locations with data from a backup or slave memory that stores the same data as memory 10. When an error is detected by the error data comparator 46, an error signal 49 is generated.

In addition to generating an error signal 49 if an error is detected, the error data comparator 46 outputs 16 bits of data to the error detection register 48. This data indicates which bits of error data are matching and which bits of error data are not matching. For example, if 16 bits of error data are compared, the data output from the error data comparator 46 would set each matching pair of error bits to a first level, such as 0, and each non-matching pair of error bits to a second level, such as 1. The error detection register 48 receives and stores the data output from the error data comparator 46. The error detection register 48 is preferably a 16-bit register, but can be sized differently in accordance with the bit-width of the error data. The error detection register 48 outputs error detection data, which identifies the matching and non-matching error bits. The non-matching error bits identify the location of the errors in the memory data. In particular, the location of errors in the memory data corresponds to the bits in the memory data that were used to generate the bit of error data that does not match the corresponding bit of error data stored in the error memory 30.

Figure 4:
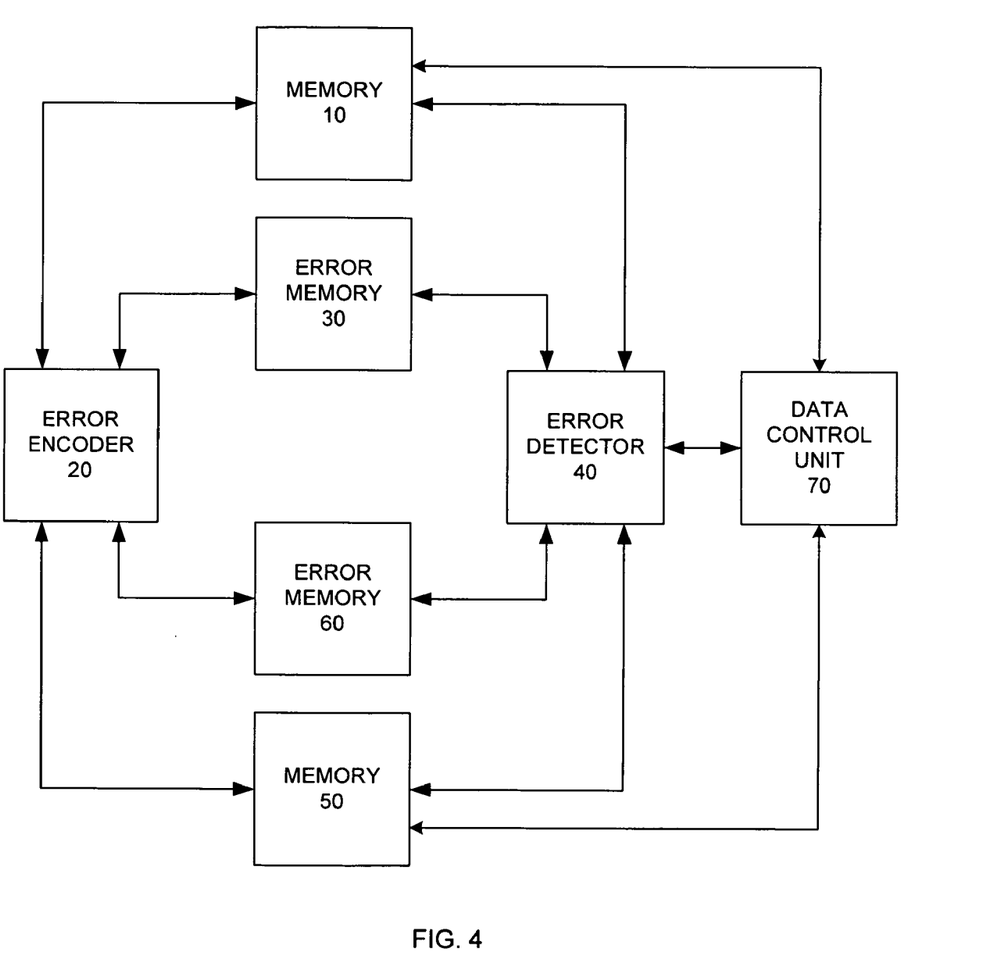
FIG. 4 is a block diagram of an enhanced error detection system consistent with the present invention.

FIG. 4 is a block diagram of an enhanced error detection system consistent with the present invention. As shown in FIG. 4, the enhanced error detection system includes memory 10, error encoder 20, error memory 30, and error detector 40. The enhanced error detection system also includes a memory 50 an error memory 60, and a data control unit 70.

The memory 50 is preferably configured in the same manner as memory 10, as described above with respect to FIG. 1. In addition, the memory 50 is stored with the same data that is stored in memory 10. In this manner, the memory 50 serves as a backup or slave memory to the memory 10, which serves as a primary or master memory.

Similarly, the error memory 60 is preferably configured in the same manner as error memory 30, as described above with respect to FIG. 1. The error memory 60 stores error data generated by the error encoder 20 from the data stored in the memory 50. Although the error encoder 20 and the error detector 40 are shown as a single element in FIG. 4, it should be understood that there can be a separate error encoder 20 and a separate error detector 40 for each of the master memory and the slave memory.

The data control unit 70 is configured to control the operation of each of the elements of the enhanced error detection system. The data control unit 70 preferably provides control, data, timing, and address signals to the elements to ensure the proper transfer of data between them. For example, in response to the error signal from the error detector 40, the data control unit 70 can control the rewriting of the data in the memory 10 with the corresponding data in the memory 50 at the locations identified as having the error, assuming the memory 50 passes its error check.

Figure 5:
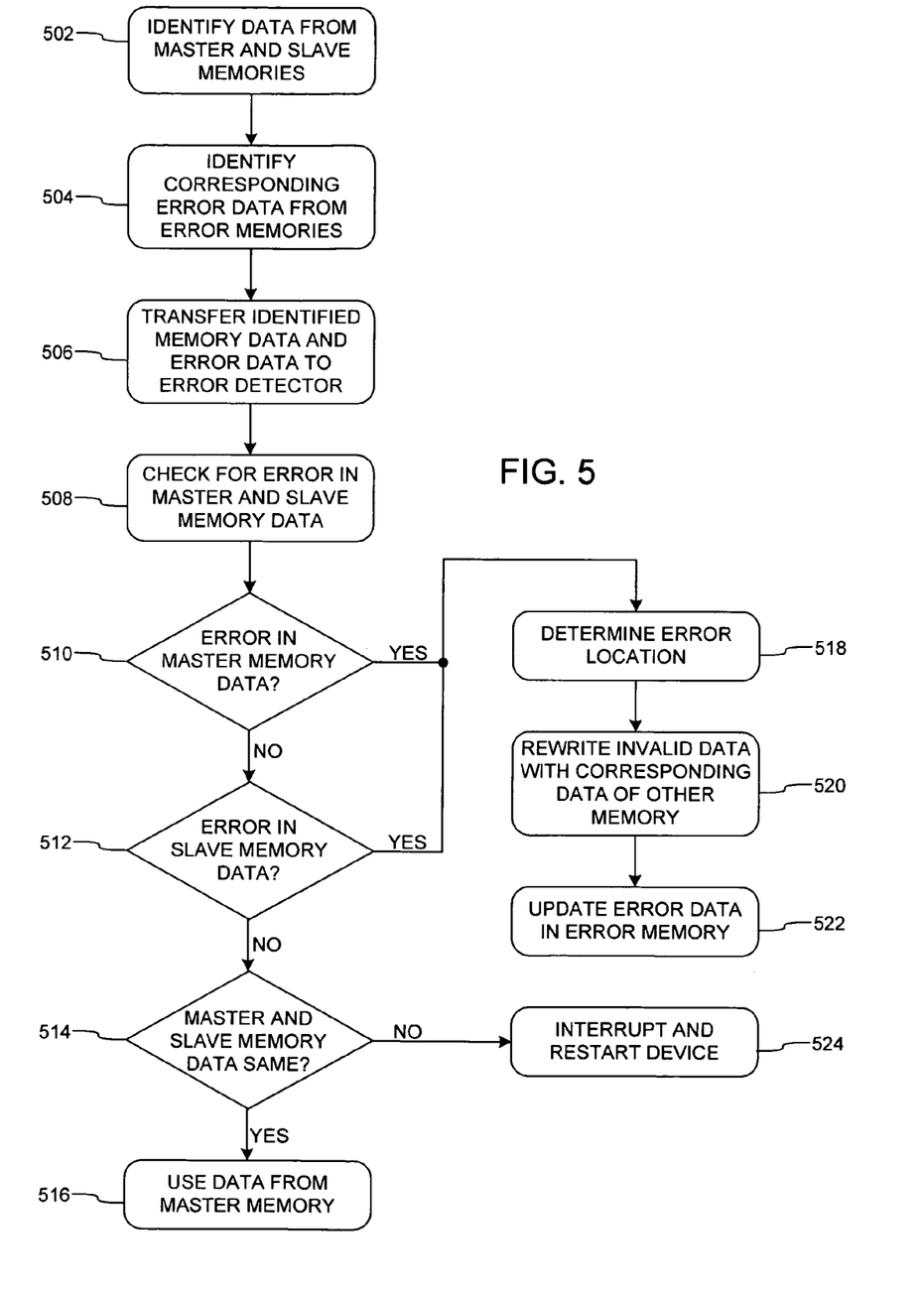
FIG. 5 is a flow diagram of an error detection process using the enhanced error detection system of FIG. 4 consistent with the present invention.

FIG. 5 is a flow diagram of an error detection process using the enhanced error detection system of FIG. 4 consistent with the present invention. As shown in FIG. 5, the data control unit 70 identifies memory data to be loaded from the memory 10 and the memory 50 (step 502). In this case, the memory 10 serves as the primary or master memory, and the memory 50 serves as the backup or slave memory. The identified data in each memory should be from the same corresponding locations, i.e., the locations of the memory data in the memory 10 should be the same locations as the memory data in the memory 50.

The data control unit 70 also identifies the corresponding error data from the error memories 30 and 60 (step 504). As discussed above, each bit of memory data is associated with at least one bit of error data. A bit of memory data is associated with a bit of error data if the bit of memory data was used to generate the bit of error data. The corresponding error data includes at least the error data generated from the identified memory data of memories 10 and 50.

The data control unit 70 controls the transfer of the identified memory data and error data to the error detector 40 (step 506). To perform the error detection for both sets of memory and error data, the error detector 40 can be configured to have a duplicate set of elements as shown in FIG. 3, with one set used for error detection of the master memory and one set used for error detection of the slave memory.

The error detector 40 receives the master memory and error data and the slave memory and error data and checks for errors in the master memory data and the slave memory data (step 508). As described above with respect to FIG. 3, the error detector 40 receives the memory data from the memory 10 (or 50), generates error data from the received memory data, and compares the generated error data to the corresponding error data received from the error memory 30 (or 60).

Based on the comparison of the error data generated from the received master memory data and the corresponding error data received from the error memory 30, the error detector 40 determines whether or not there is an error in the master memory data (step 510). There is an error in the master memory data if any of the bits of the error data generated from the received master memory data do not match the corresponding error data received from the error memory 30.

If there is an error in the master memory data (YES at step 510), then the location of the error is determined (step 518). If a bit of the error data does not match, then the bits of memory data that were used to generate that bit of error data are invalid, i.e., have an error. According, the location of the error corresponds to the location of the bits of memory data that were used to generated the non-matching bit of error data. For example, if the non-matching error bit is ED00, then the locations of the errors includes b00, b16, b32, and b48. The error location can be determined by looking at the error detection data stored in the error detection register 48 of the error detector 40. This information can be determined by the data control unit 70.

Based on the determined location of errors in the master memory 10, the data control unit 70 rewrites the data at the error locations in the master memory 10 with the data at the corresponding locations in the slave memory 50 (step 520). In addition, after updating the master memory 10, the error encoder 20 generates updated error data from the updated master memory 10 to update the error data in the error memory 30 (step 522). It is also possible to update the slave memory 30 and the error memory 60 in similar fashion after updating the master memory 10 and the error memory 30.

If there is no error in the master memory data (NO at step 510), then the error detector 40 determines whether or not there is an error in the slave memory data (step 512). Like the check of the master memory data, there is an error in the slave memory data if any of the bits of the error data generated from the received slave memory data do not match the corresponding error data received from the error memory 60.

If there is an error in the slave memory data (YES at step 512), then steps 518 to 522 are repeated. In particular, the location of the error in the slave memory 50, the data control unit 70 rewrites the data at the error locations in the slave memory 50 with the data at the corresponding locations in the master memory 10, and the data control unit 70 uses the data from the updated slave memory 50 to update the error data in the error memory 60.

If there is no error in the slave memory data (NO at step 512), then the master memory data and the slave memory data are compared by the error detector 40 to determine if they are the same (step 514). This check serves as a backup check on the error checks already performed on the master memory data and the slave memory data. If there are no errors detected in the master memory data nor the slave memory data, then the master memory data and the slave memory data should be the same.

If the master memory data and the slave memory data are not the same (NO at step 514), then the enhanced error detection system is interrupted and restarted (step 524). If the data are not the same even though no error was detected in either set of data, then the enhanced error detection system may not be operating properly. Alternatively, it may be that either the master memory data or the slave memory data has had two memory data bits change (such as due to radiation) at the same location in respective memory banks, where the two memory data bits were both used to generate the same error bit. The possibility of two memory data bits changing that were both used to generate the same error bit, e.g., the same location in different memory banks, is quite small and unlikely to ever occur. The interruption and restart can also be effected in the event that both the master memory and the slave memory fail the error check.

If the master memory data and the slave memory data are the same (YES at step 514), then the memory data from the master memory 10 is used for whatever purpose it is needed (step 516). The purpose of the memory data from the master memory 10 depends on the system or device in which the enhanced error detection system is implemented.

In the enhanced error detection system as described above, it is possible to identify and correct one or more errors in every location of a memory. As a result, it is possible to provide highly reliable data storage.

As described above, the memories 10 and 50 and the error memories 30 and 60 are each shown as independent elements. It should be understood, however, that these memories can be separate and independent elements, a single structure, or some other combination, such as a single memory data and error data memory. In addition, the error encoder 20 may be used on a time-share basis between the memories 10 and 50 so that only one set of elements as shown in FIG. 2 may be needed to generate the error data stored in the error memories 30 and 60, respectively. The error detection 40 may similarly be used on a time share basis between the memories 10 and 50 so that only one set of elements as shown in FIG. 3 may be needed to check for errors in the memory data.

The enhanced error detection system may also be configured to run diagnostics to ensure that the system is operating properly. For example, under the control of the data control unit 70, a diagnostic test can be performed in which dummy data is used that would have an error detected if the system is operating properly. If the system does not detect the error, then the data control unit 70 would recognize that the system is not operating properly. In that case, the system can be interrupted and restarted.

The foregoing description of preferred embodiments of the invention has been presented for purposes of illustration and description. It is not intended to be exhaustive or to limit the invention to the precise form disclosed, and modifications and variations are possible in light in the above teachings or may be acquired from practice of the invention. The embodiments (which can be practiced separately or in combination) were chosen and described in order to explain the principles of the invention and as practical application to enable one skilled in the art to make and use the invention in various embodiments and with various modifications suited to the particular use contemplated. It is intended that the scope of the invention be defined by the claims appended hereto and their equivalents.

What is claimed is:

1. A device for detecting at least one error in a memory, the device comprising:
    a primary memory comprising N number of primary memory banks, primary memory data being stored at predetermined locations in each of the N number of primary memory banks, wherein a predetermined location in a first primary memory bank corresponds to the same location in each of the other N−1 primary memory banks;
    a first error detection unit configured to receive the primary memory data from the primary memory and generate first primary memory error data, each error value of the first primary memory error data being determined using a set of data that includes one bit from each of the N number of primary memory banks such that the first primary memory error data includes a number of bits equal to a total number of bits in the primary memory divided by N number of primary memory banks, the bits of the set of data located at corresponding predetermined locations in the primary memory banks;
    a primary error memory configured to store the first primary memory error data;
    a second error detection unit configured to receive the primary memory data from the primary memory and generate second primary memory error data; and
    an error data comparator configured to compare the first primary memory error data with the second primary memory error data to detect the at least one error in the primary memory.

2. A device according to claim 1, wherein the error value is a parity value based on each bit in the set of data.

3. A device according to claim 1, further comprising:
    a backup memory configured to store backup memory data that is equivalent to the primary memory data stored in the primary memory; and
    a backup error memory configured to store first backup memory error data generated from the backup memory data.

4. A device according to claim 3, wherein the error detection unit is further configured to:
    compare the primary memory data with corresponding data of the backup memory data; and
    interrupt and restart the device when the primary memory data and the corresponding backup memory data are not the same.

5. A device according to claim 3, further comprising a data control unit configured to rewrite the primary memory data stored in the predetermined locations of the primary memory with the backup memory data stored in corresponding predetermined locations of the backup memory when the error data comparator determines that a generated error value in the second primary memory error data is different than a corresponding error value in the first primary memory error data.

6. A device according to claim 3, further comprising a third error detection unit configured to receive the backup memory data from the backup memory and generate the first backup memory error data, each value of the first backup memory error data being calculated from at least two data values stored at predetermined locations of the backup memory.

7. A device according to claim 6, further comprising a fourth error detection unit configured to receive the backup memory data from the backup memory and generate second backup memory error data,
    the error detection unit configured to generate a first backup error value of the second backup memory error data and to compare the first backup error value to a second backup error value of the first backup memory error data, the second backup error value corresponding to the first backup error value.

8. A device according to claim 7, wherein the data control unit is further configured to rewrite the backup memory data stored in an error location of the backup memory with the primary data stored in a corresponding location of the primary memory when the error detection unit determines that the first backup error value is different than the second backup error value, the error location determined from the comparison of the second backup memory error data and the first backup memory error data.

9. A device according to claim 1, further comprising a backup memory configured to store backup data that is equivalent to the primary data stored in the primary memory, the backup memory comprising N number of backup memory banks, wherein a data location in the plurality of primary memory banks correspond to a same data location in each of the plurality of backup memory banks.

10. A method for detecting and correcting at least one error in a memory in a device, the method comprising:
    storing primary memory data at predetermined locations in each primary memory bank of N number of primary memory banks within a primary memory, wherein a predetermined location in a first primary memory bank corresponds to the same location in each of the other N−1 primary memory banks;
    generating a first error value of the primary memory data stored at N number of predetermined locations in the primary memory, the first error value being calculated based on N number of bits each stored at the same location in each of the N number of primary memory banks, the first error value including one bit for each N number of bits;
    generating a second error value of the primary memory data;
    comparing the first error value and the second error value to detect the at least one error; and rewriting the primary memory data stored in the predetermined locations of the primary memory with backup memory data stored in corresponding predetermined locations of a backup memory when the first error value is different than the second error value stored, the backup memory data being the same as the primary memory data.

11. A method according to claim 10, further comprising:

comparing the primary memory data with corresponding data of the backup memory data; and interrupting and restarting the device when the primary memory data and the corresponding backup memory data are not the same.

12. A method according to claim 10, further comprising storing the backup memory data in the backup memory including N number of second memory banks, wherein data locations in the plurality of primary memory banks correspond to the same data locations in each of the plurality of backup memory banks.

13. A method according to claim 10, wherein generating a first error value of the primary memory data and generating a second error value of the primary memory data comprise generating error values that are parity values.

14. A method according to claim 10, further comprising generating a first backup error value of the backup memory data stored at the predetermined locations in the backup memory, the first backup error value being calculated from at least two data values stored at the predetermined locations in the backup memory.

15. A method according to claim 14, further comprising:

generating a second backup error value of the backup memory data stored at the predetermined locations in the backup memory;

comparing the first backup error value and the second backup error value; and rewriting the data stored in the predetermined locations of the backup memory with the primary data stored in corresponding predetermined locations of the primary memory when the first backup error value is different than the second backup error value.

\* \* \* \* \*